United States Patent Office 3,406,152
Patented Oct. 15, 1968

3,406,152
MODIFIED FIBER- AND FILM-FORMING POLY-
ESTERS AND IMPROVED FIBERS AND FILA-
MENTS MADE THEREFROM
Walter Koller, Frankfurt am Main, Germany, assignor to
Farbwerke Hoechst Aktiengesellschaft vormals Meister
Lucius & Brüning, Frankfurt am Main, Germany, a
corporation of Germany
No Drawing. Filed July 15, 1965, Ser. No. 472,352
Claims priority, application Germany, July 18, 1964,
F 43,486, F 43,487
4 Claims. (Cl. 260—75)

ABSTRACT OF THE DISCLOSURE

The preparation of linear, film- and fiber-forming polyesters and copolyesters by polycondensation of bis-hydroxyalkyl dicarboxylic acid esters in the presence of an alkaline or alkaline earth metal salt of benzylsilanetriol-p-sulfonic acid or a condensation product thereof as a catalyst is disclosed. The fibers and filaments manufactured from these polyesters and copolyesters exhibit an exceptionally low pilling tendency.

---

The present invention relates to a process for preparing fiber- and film-forming polyesters or copolyesters wholly or partially consisting of aromatic dicarboxylic acids and diols, more particularly it relates to an improvement in the said process. The present invention furthermore relates to improved fibers or filaments of polyesters, particularly polyethylene terephthalate.

For preparing polyesters it is known to subject to an ester interchange reaction low molecular weight alkyl esters of dicarboxylic acids with diols. The precondensation product thus obtained is then polycondensed by heating it under reduced pressure. Both reaction stages, i.e. the ester interchange reaction and the polycondensation, are strongly accelerated by the addition of catalysts. Short reaction times are preferred in order to avoid chain interrupting and decomposing reactions, which are due to the high polycondensation temperatures and which involve the formation of polyesters of low degree of polycondensation having an unsatisfactory color. A great number of catalysts have become known for the manufacture of polyesters, which catalyze either the ester interchange reaction or the polycondensation, or both reaction stages (cf. the summary of R. E. Wilfong, Journal of Polymer Science, volume 54, pages 385 et seq. (1961)). However, the known catalyst generally do not meet all requirements. A catalyst used for the manufacture of polyesters shall be active and stable under the reaction conditions, it should not catalyze secondary reactions such as dehydration reactions or decomposition reactions, for example the thermal decomposition or the decomposition of the polyesters under the action of light. Moreover, the polyesters prepared with the said catalysts should have as high as possible a degree of whiteness.

It has now been found that linear, film- and fiber-forming polyesters or copolyesters can advantageously be prepared by polycondensing bis-hydroxyalkyl-dicarboxylic acid esters in the presence of catalysts when as catalyst a compound of the general formula

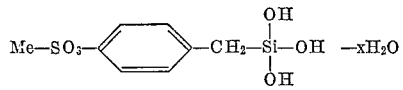

in which Me stands for an alkali metal or alkaline earth metal and x is a number below 1.5 is used.

Suitable compounds are, for example, the condensation products of sodium, potassium, or calcium salts of benzyl-silane-triol-p-sulfonic acid, obtained by hydrolysis of benzyl-silicon trichloride p-sulfonic acid with subsequent neutralization of the sulfonic acid radical with alkali metal or alkaline earth metal hydroxide solution according to the process of Meads and Kipping (Chem. Soc., volume 105 (1914), pages 679 et seq., and volume 107 (1915), pages 459 et seq.) It is particularly advantageous to use the alkali metal salts. The silane compounds are added to the ester interchange products, for example bis-ω-hydroxyalkyl terephthalates, in an amount such that the polycondensation products contain 0.01 to 0.1% of silicon. The compounds can be added in powder form or advantageously in the form of a solution in glycol. The polycondensation is carried out in usual manner by heating under gradually reduced pressure, finally under vacuum.

By bis-hydroxyalkyl-dicarboxylic acid esters there are to be understood esters containing as acid component terephthalic acid, isophthalic acid, 4,4'-diphenyldicarboxylic acid, hexahydroterephthalic acid, adipic acid, sebacic acid, naphthalenedicarboxylic acids, 2,5-dimethylterephthalic acid, 5-sulfoisophthalic acid, and bis-p-carboxy-phenoxy-ethane, and as alcohol component diols with 2 to 10 carbon atoms, for example aliphatic diols such as ethylene glycol, propane-diol, and butane-diol, furthermore aromatic diols and cycloaliphatic diols such as cyclobutanediol and 1,4-dimethylolcyclohexane. It is preferred to prepare polyesters containing as acid component more than 75% of terephthalic acid.

With the use of the catalysts according to the invention polyesters having a high degree of polycondensation are obtained after a short period of time, which polyesters are distinguished by high melting points, a high degree of whiteness and an excellent stability towards heat and light. Moreover, the proposed compounds considerably increase the melt viscosity of the polycondensation products and strongly reduce the resistance to bending of the filaments made from the polycondensation products. These two effects enable fibers to be prepared from which which non pilling fabric can be made, that is to say fabrics which do not tend to form little knots on the surface.

Processes have become known according to which the bending resistance of fibers, which is decisive for the pilling effect, can be reduced by using polyesters having a moderate degree of polycondensation. However, the said polyesters have low melt viscosities and, therefore, disturbances may occur on spinning them.

The special advantage of the process according to the invention resides in that disturbances are not encountered because even polyesters with low degree of polycondensation have a sufficiently high melt viscosity. As compared with the silicon compounds proposed in French Patent No. 1,258,006, British Patent No. 795,782 and Japanese Patent No. 6,898/63, the compounds according to the invention have the advantage of a higher catalytic activity. It is thus possible, for example, to transform bis-ω-hydroxyalkyl-terephthalate, prepared by ester interchange reaction of terephthalic acid dimethyl ester with ethylene glycol with the use of those catalysts which do not or only slightly catalyze the polycondensation or bis-ω-hydroxyalkyl-terephthalates which, besides the compounds according to the invention, do not contain other elements or compounds, into polyesters having a high degree of polycondensation.

A further advantage of the compounds to be used according to the invention is their high thermal stability and chemical inertness, so that discolorations, which may occur with the use of antimony compounds by reduction to elementary antimony in the course of polycondensation, are avoided.

Besides, it is advantageous that the compounds according to the invention are not inactivated by compounds of trivalent phosphorus, which are used as additives for improving the properties of the polyesters.

Fabrics made from polyethylene terephthalate fibers have quite a number of advantageous properties, for example high strength, dimensional stability, permanence of pleats, resistance to solvents and chemical agents. However, they have the drawback that they pill on being used, that is to say little knots are formed on the surface. Particularly with loose woven fabrics this effect is so pronounced that they cannot be used in the textile field.

As already stated above, the pilling effect is due to the high bending resistance of polyethylene terephthalate fibers. Attempts have, therefore, been made to reduce the bending resistance of the fibers by suitable additives in the spinning process, by the use of polyethylene terephthalate of moderate degree of polycondensation, or by a decomposing treatment of the fabric.

However, all these processes have disadvantages. Polyethylene terephthalate having a moderate degree of polycondensation cannot be spun without troubles because of its low melt viscosity. Moreover, this method does not reduce the pilling effect to a satisfactory extent. The subsequent decomposition of polyethylene terephthalate necessitates the maintenance of very definite reaction conditions and is difficult to control.

Furthermore, it has now been found that polyethylene terephthalate fibers, which are especially suitable for making fabrics with low tendency to pilling, are obtained by spinning from the melt in known manner polyethylene terephthalate having a relative viscosity of 1.2 to 2 with the addition of 0.2 to 2% by weight of a compound of the general formula

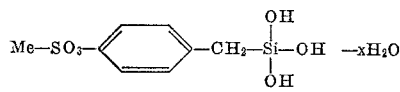

in which Me stands for an alkali metal or alkaline earth metal, for example sodium, potassium or calcium and barium, and $x$ is a number below 1.5. Suitable additives are the silane compounds described above.

The polyethylene terephthalate fibers which have been spun in this manner have a considerably lower resistance to bending and when fabrics are made therefrom they have but a very low tendency to pilling. Loose woven fabrics made with the said fibers can be used in the textile field.

The following examples serve to illustrate the invention but they are not intended to limit it thereto.

EXAMPLE 1

12 kilograms of terephthalic acid dimethyl ester, 9 kilograms of ethylene glycol and 8.4 grams of calcium acetate were heated at 160–210° C., while stirring, for 165 minutes in an apparatus of stainless steel. An ester interchange product essentially consisting of bis-ω-hydroxyethyl terephthalate formed with separation of methanol. To the precondensation product thus obtained there were added 3.2 kilograms of an ethylene glycol solution containing 48 grams of the sodium salt of benzylsilane-triol-p-sulfonic acid, 267 grams of an 18% suspension of titanium dioxide in ethylene glycol, and 2.16 g. of triphenylphosphite and the mixture was polycondensed with separation of ethylene glycol. The temperature was first raised from 245° C. to 275° C. within 2 hours and the pressure was reduced from 760 mm. of mercury to 1 mm. of mercury. After having heated for a further 195 minutes at 275° C. under a pressure of 0.3 mm. of mercury the polycondensate was pressed through a nozzle with one orifice having a diameter of 2 cm., the wire obtained was chilled with water and cut to chips about 5 mm. long. The chips obtained had a melting point of 262.2° C. and a relative viscosity of 1.670, determined with a 1% solution of the polycondensate in phenol/tetrachloroethane 3:2 at 25° C. After having been dried for 2 hours at 180° C., the material was spun at 290° C. by means of an extruder through a spinneret with 24 orifices each having a diameter of 0.25 mm. at a conveying speed of 18.3 grams per minute and with a draw-off speed of 500 meters per minute.

The filaments of 83 bobbins were combined to form a cable having a titer of about 2000 deniers. The cable was drawn at a rate of 1:4, while passing with a supply speed of 13.5 meters through a steam zone 2 meters long. After having been conducted over two heated surfaces 2.40 meters long, one having a temperature of 100° C., the other one of 118° C., the cable was passed over a preparation roll and then dried on a heated surface 2.40 meters long and 240° C. hot. The cable was then crimped by the stuffing crimping process and cut to pieces 79.2 mm. long. The fibers obtained had a tensile strength of 3.5 g./den. and an elongation at break of 63%.

Fabrics made from the fibers (setting 22/20, weave four harness twill), which had not been shorn, did not pill after 90 minutes when tested in the Random-Tumble-Pilling Tester of Atlas Electric Devices Co. (cf. ASTM Standard on Textile Materials 1961, page 552 and Bulletin X96 of Du Pont de Nemours & Co., Wilmington, Del., U.S.A.), while a comparative fabric made from normal polyethylene terephthalate fibers had a strong tendency to pilling. As to the other utilitarian properties such as crease resistance, stability of pleats, wear resistance and shrinkage no difference could be observed.

EXAMPLE 2

A 1.5% solution of 0.544 gram of the sodium salt of benzylsilane-triol-p-sulfonic acid in ethylene glycol was added uniformly and in a thin jet, while stirring, to a melt of 160° C. of 178 grams of pure, dried and catalyst-free terephthalic acid bis-β-hydroxyethyl ester melting at 110° C. The melt was then heated at 250° C. under nitrogen while the pressure was gradually reduced to below 1 mm. of mercury within the course of 165 minutes. The temperature was then raised to 278° C. within 10 minutes. After 210 minutes a colorless polycondensate was obtained having a melting point of 261° C. and a relative viscosity of 1.850. The melt viscosity of the polycondensate was considerably higher than that of a polyethylene terephthalate prepared with 0.07% of calcium acetate and 0.02% of antimony trioxide and having the same solution viscosity. The resistance to stirring was about two to three times higher.

EXAMPLE 3

122.4 grams of terephthalic acid dimethyl ester, 13.6 grams of isophthalic acid dimethyl ester, 108.9 grams of ethylene glycol and 0.0997 gram of calcium acetate were heated at 160–210° C. for 4–5 hours and while stirring. An ester interchange product formed essentially consisting of the bis-β-hydroxyethyl esters of terephthalic acid and isophthalic acid, while methanol was split off. An about 1.5% solution of 0.544 gram of the sodium salt of benzylsilane-triol-p-sulfonic acid in ethylene glycol was added to the reaction product obtained and the mixture was polycondensed with separation of ethylene glycol. The mixture was first heated at 250° C. under nitrogen while the pressure was gradually reduced to below 1 mm. of mercury within the course of 165 minutes. The temperature was then raised to 278° C. within a short period of time. After 165 minutes a colorless polycondensate was obtained which melted at 236.4° C. and had a relative viscosity of 1.805.

EXAMPLE 4

136 grams of terephthalic acid dimethyl ester, 4.4 grams of the potassium salt of 5-sulfoisophthalic acid dimethyl ester and 109 grams of ethylene glycol were subjected to an ester interchange reaction and polycondensed as described in Example 3. After a time of polycondensation of 135 minutes at 278° C., a colorless polycondensate was obtained which melted at 257.5° C. and had a relative viscosity of 1.532.

EXAMPLE 5

985 parts by weight of polyethylene terephthalate granules having a granular size of 1 to 2 mm., a melting point of 261.8° C., a relative viscosity of 1.815, determined with a 1% solution of the polymer in phenol/tetrachloroethane 3:2, which had been prepared from terephthalic acid dimethyl ester and ethylene glycol according to the ester interchange/polycondensation process with the use of 0.05% of manganese acetate and 0.03% of antimony trioxide as catalysts and with the addition of 0.4% of titanium dioxide as delusterant, were dried for 2 hours at 180° C., 3.95 parts by weight of finely ground sodium salt of benzylsilane-triol-p-sulfonic acid (grain size less than 10μ) were added and the mixture was spun at 290° C. by means of an extruder through a spinneret with 24 orifices each having a diameter of 0.25 mm. with a conveying speed of 18.3 grams per minute and a draw-off speed of 500 meters per minute.

The filaments of 83 bobbins were combined to form a cable having a titer of about 2000 deniers. The cable was drawn at a rate of 1:4 while passing with a supply speed of 13.5 meters through a steam zone 2 meters long. After having been conducted over two heated surfaces 2.40 meters long, one having a temperature of 100° C. the other one of 118° C., the cable was passed over a preparation roll and then dried on a heated surface 2.40 meters long and 240° C. hot.

The cable was then crimped by the stuffing crimping process and cut to pieces 79.2 mm. long. The fibers thus obtained had a tensile strength of 3.3 grams/denier and an elongation at break of 49%. A fabric made from the said fiber (setting 22/20, weave four harness twill), which had not been shorn, did not pill after 90 minutes when tested in the Random-Tumble-Pilling Tester of Atlas Electric Devices & Co. (cf. ASTM Standard on Textile Material 1961, page 552 and Bulletin X 96 of Du Pont de Nemours & Co., Wilmington, Del., U.S.A.), while a comparative fabric made from normal polyethylene terephthalate fibers had a strong tendency to pilling. As to the other utilitarian properties such as crease resistance, stability of pleats, wear resistance and shrinkage no difference could be observed.

I claim:

1. In a process for preparing linear, film- and fiber-forming polyesters and copolyesters by polycondensation of bis-hydroxyalkyl dicarboxylic acid esters in the presence of catalysts, the improvement which comprises carrying out the reaction in the presence of a catalytic amount of a catalyst of the general formula

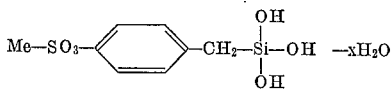

in which Me stands for an alkali metal or alkaline earth metal and $x$ is a number below 1.5.

2. The process of claim 1 wherein the catalyst is used in an amount such that the polyesters obtained contain from .01 to .1% by weight of silicon based on the weight of said polyesters.

3. A composition of matter consisting essentially of polyethylene terephthalate having a relative viscosity of 1.2 to 2, determined with a 1% solution of the polyethylene terephthalate in phenol/tetrachloroethane 3:2 at 25° C. and 0.2 to 2% by weight, based on the weight of said polyethylene terephthalate, of compounds of the general formula

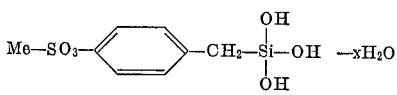

4. Filaments and fibers consisting essentially of polyethylene terephthalate having a relative viscosity of 1.2 to 2, determined with a 1% solution of the polyethylene terephthalate in phenol/tetrachloroethane 3:2 at 25° C. and 0.2 to 2% by weight, based on the weight of said polyethylene terephthalate, of compounds of the general formula

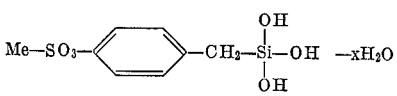

in which Me stands for an alkali metal or akaline earth metal and $x$ is a number below 1.5.

References Cited

UNITED STATES PATENTS

| | | | |
|---|---|---|---|
| 3,201,506 | 8/1965 | Bills | 264—210 |
| 3,335,211 | 8/1967 | Mead et al. | 264—176 |

OTHER REFERENCES 795,782   5/1958   Great Britain.

WILLIAM H. SHORT, *Primary Examiner.*

LOUISE P. QUAST, *Assistant Examiner.*